Oct. 13, 1970 G. R. SCHULZ 3,533,544

CAPSTAN DRIVE ASSEMBLY

Filed Dec. 20, 1968 2 Sheets-Sheet 1

INVENTOR.
GORDON RICHARD SCHULZ
BY Jackson & Jones
ATTORNEYS.

Oct. 13, 1970 G. R. SCHULZ 3,533,544

CAPSTAN DRIVE ASSEMBLY

Filed Dec. 20, 1968 2 Sheets-Sheet 2

United States Patent Office 3,533,544

Patented Oct. 13, 1970

3,533,544

CAPSTAN DRIVE ASSEMBLY

Gordon Richard Schulz, Tujunga, Calif., assignor, by mesne assignments, to Subscription Television, Inc., New York, N.Y., a corporation of Delaware Filed Dec. 20, 1968, Ser. No. 785,642
Int. Cl. G11b *15/43*
U.S. Cl. 226—51 10 Claims

ABSTRACT OF THE DISCLOSURE

A capstan drive assembly is disclosed having a pair of pulleys connected ot a pair of capstans with a circular belt being looped over the peripheries of the capstan pulleys. A drive pulley and an idler pulley are located between the capstan pulleys to frictionally engage the unsupported sections of the belt, whereby the entire length of the belt is frictionally engaged by the peripheral sections of the pulleys at all times.

BACKGROUND OF THE INVENTION

Field of the invention

This invention relates to tape recording systems and more particularly to the magnetic tape drive assemblies.

Description of the prior art

It is the object of all tape recorders to record sound transmissions and reproduce them as precisely as possible. However, in order to achieve true sound reproduction many problems are encountered, both electronically and mechanically.

A major problem encountered has been with flutter disturbance occurring within the tape transport assembly. Such a disturbance is caused by the speed variations of the magnetic tape drive, commonly known as the capstan drive assembly. The capstan assembly includes a pair of rotating capstans located on both sides of a magnetic head assembly for frictionally driving a magnetic tape across a magnetic head assembly. The magnetic head assembly functions to record, erase and reproduce sound transmissions onto or from the magnetic tape. Any speed variations which occur in the capstan drive assembly are, of course, transmitted to the magnetic tape. As a result the variations of speed in the magnetic tape travel causes distortions to occur in the recording and reproduction of the sound transmissions. Ideally, if the magnetic tape traveled at a constant velocity over the magnetic head assembly no distortion caused by flutter disturbance would occur. However, it has been found that all prior tape transports produce a certain amount of speed variation in the tape travel. The object, of course, is to reduce the amount of speed variation to an acceptable level whereby any resulting sound distortion is not readily detectable.

As a general rule the capstans are driven by a constant speed motor which is drivingly connected thereto by transmission means. One type of transmission utilized in capstan assemblies is a gearing arrangement having a pinion connected to the motor to drivingly engage a pair of gears which is connected to the capstans. However, speed variations of high amplitude are inheernt in such gear drives because of the uneven engagement of the mating teeth of the gears. As a result this type of transmission is rarely used.

Most capstan assemblies utilize belt and pulley transmissions. The main advantage of the belt and pulley means is that there is a constant engagement between the belt and the respective pulleys. However, flutter disturbance still exists in such transmissions and a major factor in causing this phenomenon is the resonance developed by the natural frequency of the system which occurs within the operating speeds of the system. Various factors contribute to the creation of resonance, such as an unbalance in the pulleys or any misalignment therein. Another contributing factor is the elasticity of the belts which are utilized. It has been found that the resonance can be improved by utilizing belts having good damping qualities. However, such belts have very poor fatigue qualities. As a result an unsatisfactory compromise usually exists in the belt section, i.e. the more durable the belt, the poorer are the damping qualities and vice versa. Furthermore, prior tape transports have been constructed in such a manner that the motor pulley is located at such a distance from the capstan pulleys that a large portion of the belt loop is unsupported at any one time. Such large lengths of unsupported belt have increased the amplitude of resonance in the system.

SUMMARY OF THE INVENTION

The invention obviates the problems encountered by prior capstan assemblies by providing a pulley and belt arrangement that has a natural frequency higher than the operating speeds of the system. The novel drive assembly includes a pair of pulleys rigidly connected to a pair of capstans; a drive pulley lying in the same plane as the capstan pulleys, with the periphery of the drive pulley extending to the periphery of each of the capstan pulleys; and an idler pulley also lying in the same plane as the capstan pulleys with the periphery of the idler pulley also extending to the periphery of each of the capstan pulleys. The idler pulley further has an arcuate section of its periphery facing an arcuate section of the drive pulley. A circular belt is looped about the peripheries of the capstan pulleys with the unsupported section being drawn together by the arcuate sections of the drive and idler pulleys, forming a figure-8 configuration. In this configuration substantially the entire length of the belt is frictionally engaged by the peripheral sections of the pulleys at all times. The pulley connected to the capstan, that is forward of the magnetic head assembly with respect to the travel of the magnetic tape, is of a smaller diameter than the other capstan pulley to provide a speed differential between the two capstans to maintain the tape in tension as it travels over the magnetic head assembly. Another set of pulleys is provided to drive the capstans in a reverse direction and means are provided to selectively drive the capstans in either direction.

The invention thus fulfills a primary object by providing a novel tape transport that substantially reduces the amount of flutter disturbance occurring in the system.

Another object of the invention is to provide a capstan drive assembly with differential speeds operable in both rotational directions.

The features of the present invention which are believed to be novel are set forth with particularity in the appended claims. The present invention, both as to its organization and manner of operation, together with further objects and advantages thereof, may best be understood by reference to the following description taken in connection with the accompanying drawings.

DESCRIPTION OF THE PREFERRED EMBODIMENT

Figure 1:
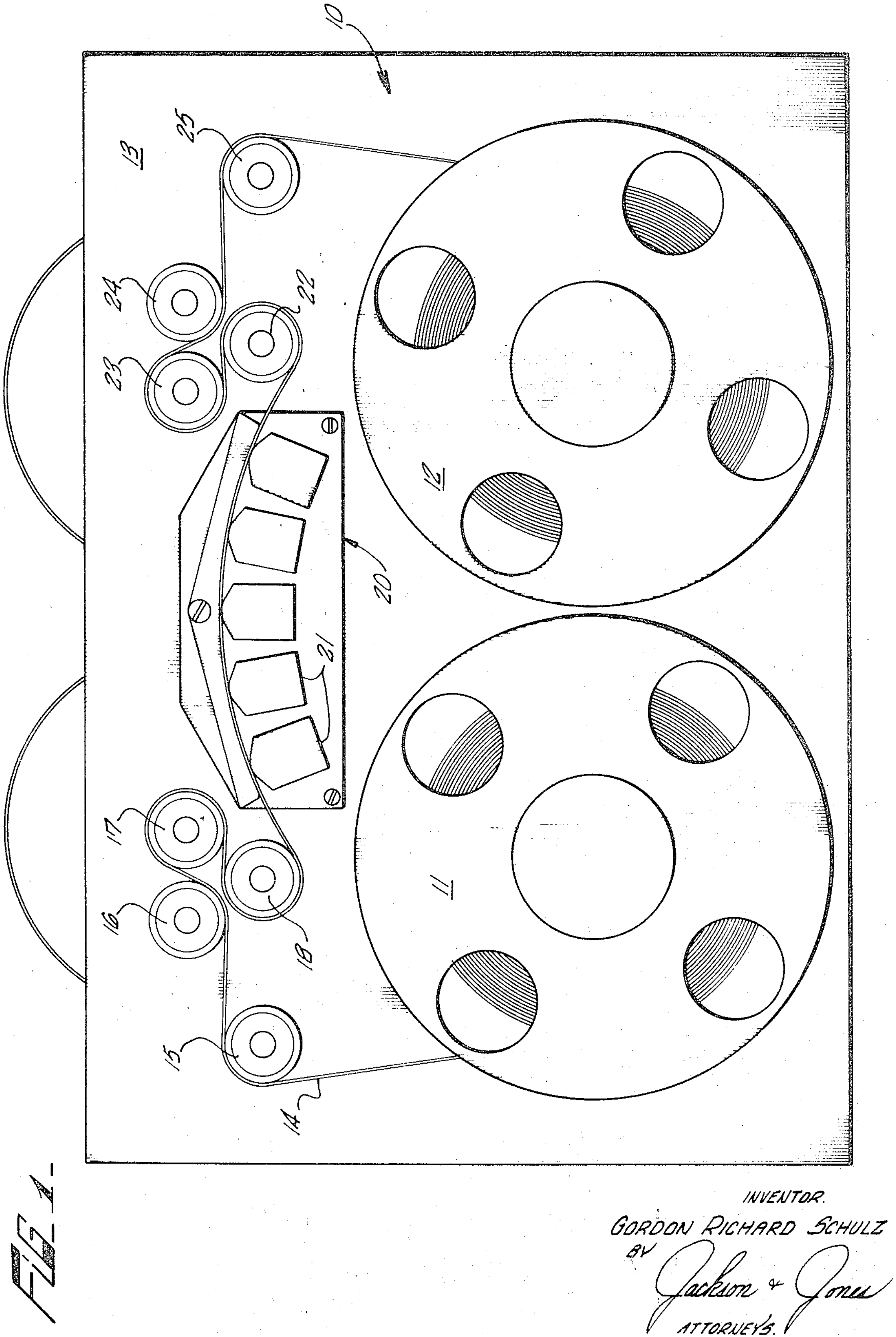
FIG. 1 is a top plan view of a tape recorder with a magnetic tape being driven by a pair of capstans across the magnetic head assembly.

Referring to the drawings, FIG. 1 shows a tape recorder generally indicated by arrow 10, having a supply reel 11 and a take-up reel 12 rotatively supported on a deck 13. A length of magnetic tape 14 is unwound from the supply reel 11 and drawn across a pair of guides 15 and 16. The tape 14 is then wound about the periphery of a rotating capstan 17 to be frictionally driven thereby. The tape 14 is then driven around a guide 18 and across a magnetic head assembly shown generally by arrow 20. The magnetic head assembly 20 includes a plurality of magnetic heads 21, each of which frictionally engages the magnetic tape and functions to record, erase, or reproduce sound transmissions onto or from the tape 14.

The tape 14 is then drawn around a guide 22 and then about the periphery of a rotating capstan 23 to also be frictionally driven thereby.

Finally, the tape 14 is led around a pair of guides 24 and 25 onto the take-up reel 12. The take-up reel 12 is rotatably driven in a conventional manner to take up the slack of the magnetic tape 14 as it is being fed thereto by the capstan 23. During the rewind cycle the supply reel is also rotatably driven in the opposite direction in the conventional manner, to take up the slack in the magnetic tape 14 as it is being fed thereto by the capstan 17.

Figures 2, 3:
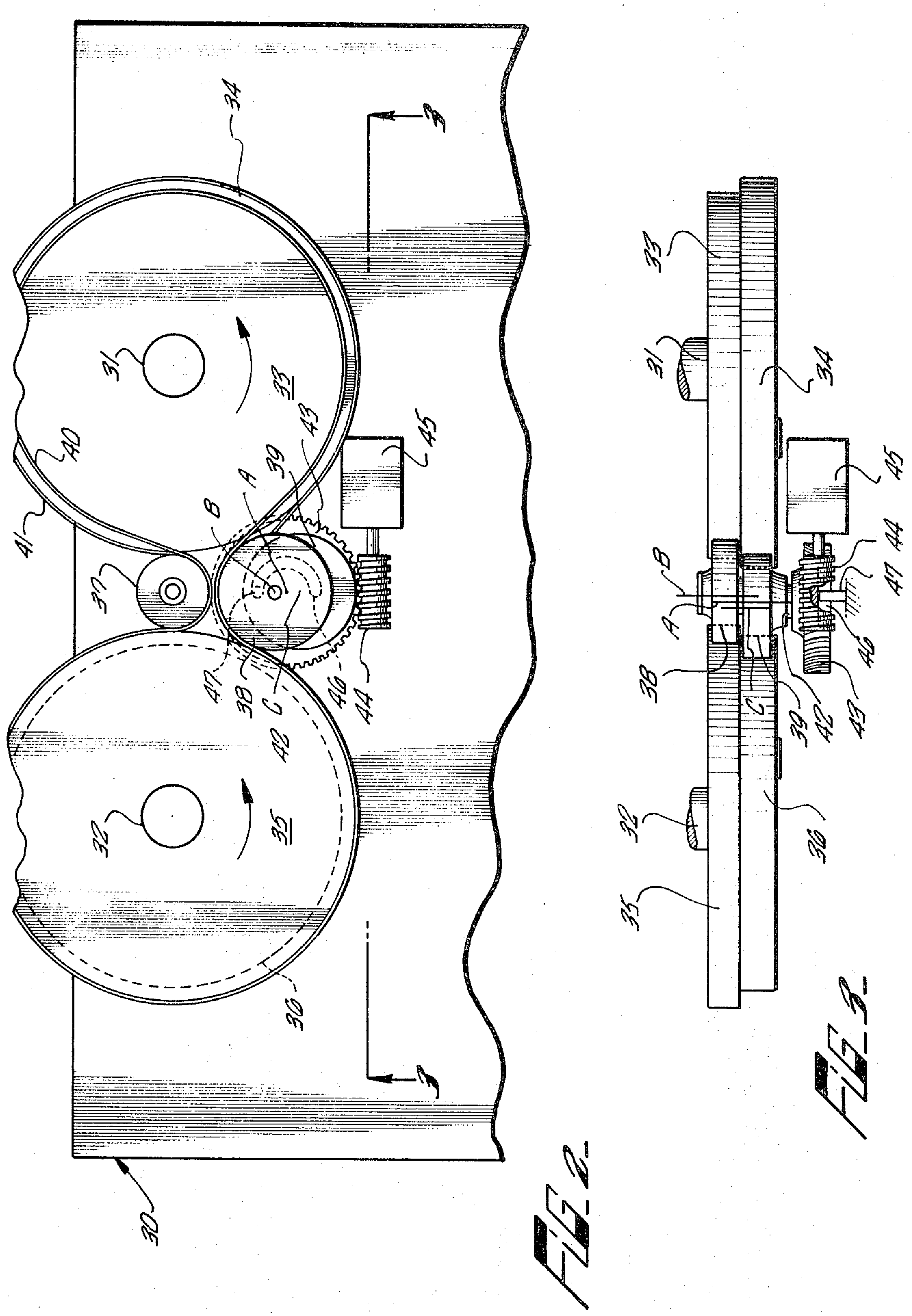
FIG. 2 is a plan view of the belt and pulley transmission in accordance with the present invention.
FIG. 3 is a fragmentary side view of the pulley and belt arrangement taken along lines 3—3 of FIG. 2.

Referring now to FIGS. 2 and 3 a pulley and belt assembly generally indicated by arrow 30 is located below the deck 13 of the tape recorder 10 to drive the capstans 17 and 23. The capstan 23 is rigidly connected to a shaft 31 which extends through the deck 13 and is journaled therein. In like manner the capstan 17 is rigidly connected to a shaft 32 which also extends through the deck 13 and is journaled therein. The end of the shaft 31 which extends below the deck 13 is rigidly connected to a pair of pulleys 33 and 34, as is the shaft 32 which is rigidly connected to a pair of pulleys 35 and 36.

A drive pulley 37 is located between the sets of pulleys and is rotatably driven by a constant speed motor, not shown.

A pair of idler pulleys 38 and 39 is also rotatably supported between each pair of pulleys 33 and 35, and 34 and 36, respectively. It should be noted that each of the idler pulleys 38 and 39 includes arcuate sections that face an arcuate section of the drive pulley 37. A circular belt 40 is looped about the peripheries of the pulleys 33 and 35 with the unsupported sections being drawn together by the aforementioned arcuate sections of the drive pulley 37 and idler pulley 38, thereby forming a figure-8 configuration. It should be noted that substantially the entire length of belt is frictionally engaged by the peripheral sections of the pulleys at all times. In like manner a circular belt 41 is looped about the peripheries of the pulleys 34 and 36, with the middle section being drawn together by the aforementioned arcuate sections of the drive pulley 37 and the idler pulley 39.

The diameter of the pully 33 is smaller than the diameter of pulley 35, while the diameter of pulley 34 is larger than that of the pulley 36. The reason for this is to provide a speed differential in the capstans in both directions of rotation to maintain a slight tension in the magnetic tape 14 as it travels across the magnetic head assembly 20. The differences in diameter are shown greatly exaggerated for illustrative purposes only. In reality the amount of difference required is bearly visible to the eye. As shown, the pulleys 33 and 35 are rotatably driven by the belt 40 to rotate the capstans 17 and 23 in a clockwise direction to drive the magnetic tape 14 in the forward direction. The pulleys 34 and 36 are driven by the belt 41 to rotate the capstans 17 and 23 in a counterclockwise direction to rewind the tape 14 in the opposite direction. As can be seen, the pulley and belt arrangement that is utilized depends on the direction of travel of the tape 14 desired.

The idler pulley assembly is utilized to affect the selection of tape travel. As shown in FIGS. 2 and 3 the pulleys 38 and 39 are rotatably mounted on a shaft 42 which is rotatable about an axis A. The pulleys 38 and 39 are mounted eccentrically on the shaft 42 at angles of 180° from each other. The pulley 38 rotates about an axis B while pulley 39 rotates about an axis C. The shaft 42 is rigidly connected to a worm wheel 43 which in turn is rotatably driven by a worm gear 44 that is driven by a D.C. motor 45. An arcuate slot 46 is formed within the worm wheel 43 with an index pin 47, which is fixed to the housing of the tape recorder 10, extending into the arcuate slot 46. The index pin 47 serves as a stop to limit the travel of the worm wheel 43 to rotate about a 180° arc. It should be noted that in FIG. 3 the worm wheel 43 has been rotated 90° from the position shown in FIG. 2 to more clearly illustrate the eccentricities of pulleys 38 and 39 rotating about their respective axes B and C. In operation, if it were desired to drive the magnetic tape 14 in the forward direction, the D.C. motor 45 would drive the worm gear 44 to rotate the worm wheel 43 in such a clockwise direction until it is stopped by the index pin 47, as shown in FIG. 2. In this position the idler pulley 38 rotating about axis B is located at a point nearest the drive pulley 37 while the idler pully 39 rotating about axis C, being 180° out of phase, is at a point furthest from the drive pulley 37. In this position the belt 40 is then held taut by the idler pulley 38 while it is being driven by the drive pulley 37 to rotate the pulleys 33 and 35 in a counterclockwise direction, as shown in FIG. 2. Since the idler pulley 39 is in a position further away from the drive pulley 37, the belt 41 is not under as much tension as the belt 40. This is necessary to permit slippage of belt 41 to occur. The reason for this is that the belt 40 and 41 are driven at the same linear speed by the drive pulley 37, and in this direction of rotation the pulley 34 is driven at a speed faster than the pulley 36. Since the pulley 34 is of a larger diameter than the pulley 36 the belt 41 must travel slower than the tangential speed of the pulley 34 and faster than the tangential speed of the pulley 36, if it is to travel the same speed as belt 40. Therefore, being in a loosened condition, the belt 41 is permitted to slip as it travels over the pulleys 34 and 36 thereby obviating any binding that would result if no slippage occurred.

If it were desired to rotate the magnetic tape 14 in the opposite direction, the polarity of the D.C. motor would be reversed to drive the worm gear 44 to rotate the worm wheel 43 in the counterclockwise direction until the worm wheel 43 is again stopped by the index pin which is now located at the other end of the arcuate slot 46. In this position the idler pulley 39 is located nearest the drive pulley 37 while the idler pulley 38 is furtherest from the drive pulley 37. As a result, the belt 41 is then held taut by the idler pulley 39 and is driven by the drive pulley 37 which also has reversed its rotation to drive the pulleys 34 and 36 in a clockwise direction, as shown in FIG. 2. Since the belt 40 is not maintained under tension, belt slippage occurs permitting the pulley 35 to rotate at a speed faster than pulleys 33 even though it is of a larger diameter. It should be noted that the worm wheel 43 is positively locked against the index pin 47 by the constant torque supplied by the D.C. motor 45.

Thus the novel pulley arrangement enables the capstans 17 and 23 to be driven at differential speeds in both directions of rotation.

An important feature of this arrangement is that the peripheries of the drive pulley 37 and the idler 38 and 39 extend to the peripheries of the pulleys 33, 34, 35 and 36, respectively. In this manner the belts 40 and 41 are nearly totally supported by the peripheral sections of the pulleys at all times with very little of the lengths of each of the belts 40 and 41 being unsupported. With this arrangement the belts 40 and 41 are more restrained resulting in spring constants being substantially higher than the spring constants of belts having a large amount of unsupported length. It has been found that the natural frequency of a belt and pulley arrangement is directly proportional to the spring constants of the belts. As a result, because of this novel arrangement of supporting substantially the entire length of the pulleys, the natural frequencies of the capstan drive resonance have been placed above the operating speeds of the system, and any speed variations in the tape due to this resonance is avoided. As a result the flutter disturbance in this system can be maintained at a very low acceptable level.

It should be noted that the peripheries of the pulleys 33 and 36 do not extend as close to the drive pulley 37 as do the pulleys 34 and 35. This is to enable the respective pulleys to rotate about the same axes. However, if differential speeds between the capstans were not desired, only one set of pulleys would be required, i.e. pulleys 33, 35, 37 and 38, and it would be preferred to have the periphery of pulley 33 extend to the drive pulley 37 to completely support the entire length of the belt 40.

Although this drive means has been described with relation to a belt and pulley arrangement for driving rotating capstans, such a concept could also be adapted to tape driving means where substantially the entire length of the magnetic tape is supported to prevent tape flutter.

What is claimed is:

1. A capstan drive assembly for a tape recorder having a magnetic head assembly located on the deck thereof comprising:

- a pair of capstans located on opposite sides of the magnetic tape across the magnetic head assembly, said capstans being integrally connected to a pair of parallel shafts which extend through the deck and are rotatably journaled therein;
- a first pulley rigidly connected to one of said capstan shafts on the side of the deck opposite said capstan;
- a second pulley rigidly connected to the other of said capstan shafts on the side of the deck opposite said capstan;
- a first drive pulley rotatably supported about an axis parallel to said capstan shafts, the periphery of said first drive pulley extending to the peripheries of said first and second pulleys;
- a first idler pulley rotatably supported about an axis parallel to said capstan shafts, the periphery of said first idler pulley also extending to the peripheries of said first and second pulleys, said first idler pulley having an arcuate section of its periphery facing an arcuate section of said first drive pulley; and
- a first closed belt being looped about the peripheries of said first and second pulleys with the unsupported sections of said belt being drawn together by said arcuate sections of said first drive and idler pulleys to form a figure-8 configuration, whereby substantially the entire length of said first belt is frictionally engaged by the peripheral sections of said pulleys at all times.

2. The invention in accordance with claim 1 wherein said first pulley is connected to the capstan on the forward side of the magnetic head assembly with regard to the direction of travel of the magnetic tape across the magnetic head assembly with said first pulley being of a smaller diameter than said second pulley to rotate the forward capstan at a faster speed thereby maintaining the magnetic tape in tension as it travels across the magnetic head assembly.

3. The invention in accordance with claim 1 further including:

- a third pulley rigidly connected to the capstan shaft that supports said first pulley;
- a fourth pulley rigidly connected to the capstan shaft that supports said second pulley;
- a second drive pulley rotatably supported about an axis parallel to said capstan shafts, the periphery of said first drive pulley extending to the peripheries of said third and fourth pulleys;

- a second idler pulley rotatably supported about an axis parallel to said capstan shafts, the periphery of said second idler pulley also extending to the peripheries of said third and fourth pulleys, said second idler pulley having an arcuate section of its periphery facing an arcuate section of said second drive pulley;
- a second closed belt being looped about the peripheries of said third and fourth pulleys with the unsupported sections of said belt being drawn together by said arcuate sections of said second drive and idler pulleys to form a figure-8 configuration whereby substantially the entire length of said second belt is frictionally engaged by the peripheral sections of said pulleys at all times; and
- means for selectively moving said first and second idler pulleys away from said first and second drive pulleys respectively whereby only one belt is maintained under tension at one time to frictionally drive its respective pulleys.

4. The invention in accordance with claim 3 wherein said third pulley is of a larger diameter than said fourth pulley to rotate the rearward capstan at a faster speed to maintain the magnetic tape in tension as it travels across the magnetic head assembly.

5. The invention in accordance with claim 4 wherein said first and second idler pulleys are eccentrically mounted on an idler pulley shaft 180° apart from said shaft axis of rotation and said means for moving said idler pulleys includes means for rotating said idler pulley shaft whereby one of said idler pulleys is moved to the position nearest said drive pulleys while the other of said idler pulleys is moved to the position furthest from said drive pulleys.

6. The invention in accordance with claim 5 wherein said means for rotating said idler pulley shaft includes:

- a gear rigidly connected to said idler pulley shaft; and
- a motor driven gear drivingly engaging said gear to rotate said gear in both directions of rotation.

7. The invention in accordance with claim 6 further including means for limiting the rotation of said gear about a 180° angle.

8. The invention in accordance with claim 7 wherein said limiting means includes:

- an arcuate slot of 180° formed within said gear; and
- fixed pin means extending within said slot to act as a stop to restrain said gear from moving further than 180° in either rotational direction.

9. A drive assembly comprising:

- first and second pulleys rotating about parallel axes;
- a rotatably supported drive pulley having its driving periphery extending to the peripheries of said first and second pulleys;
- a rotatably supported idler pulley having its periphery extending to the peripheries of said first and second pulleys, said idler pulley having an arcuate section of its periphery facing an arcuate section of said drive pulley; and
- a belt being looped substantially about the peripheries of the first and second pulleys and the arcuate sections of said drive and idler pulleys.

10. The invention in accordance with claim 9 wherein said drive and idler pulleys rotate about axes parallel to the axes of said first and second pulleys.

References Cited

UNITED STATES PATENTS

| | | | |
|---|---|---|---|
| 510,694 | 12/1893 | Marsh | 74—722 X |
| 716,520 | 12/1902 | Cole | 74—226 X |
| 3,140,620 | 7/1964 | Ferara | 74—221 |
| 3,335,929 | 8/1967 | Branco et al. | 226—188 X |

ALLEN N. KNOWLES, Primary Examiner

U.S. Cl. X.R.

226—108, 188, 195; 74—722, 217